March 3, 1931. J. J. NAUGLE 1,794,916
MEANS FOR TREATING LIQUIDS
Filed May 3, 1926 2 Sheets-Sheet 1
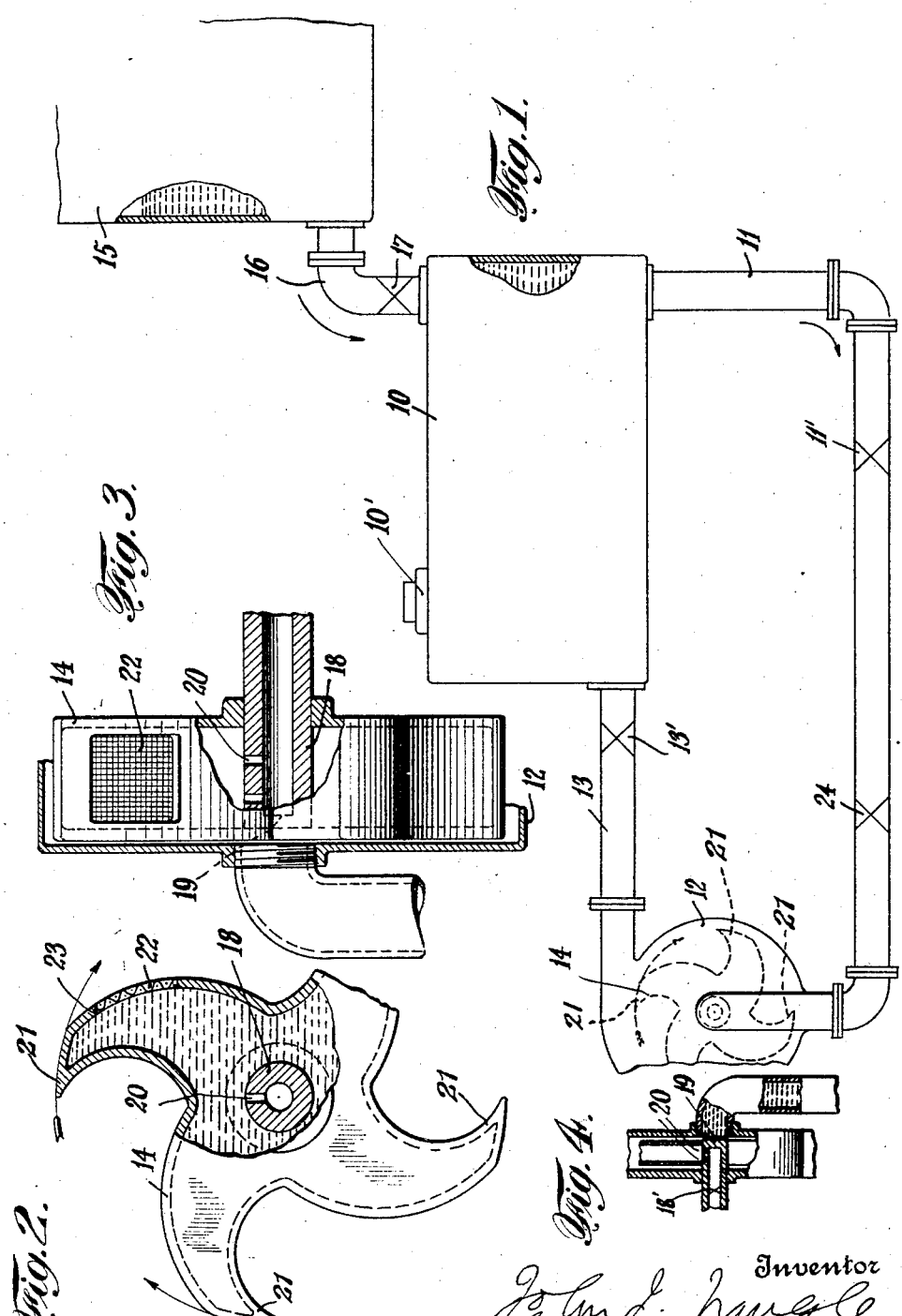

March 3, 1931.  J. J. NAUGLE  1,794,916
MEANS FOR TREATING LIQUIDS
Filed May 3, 1926  2 Sheets-Sheet 2
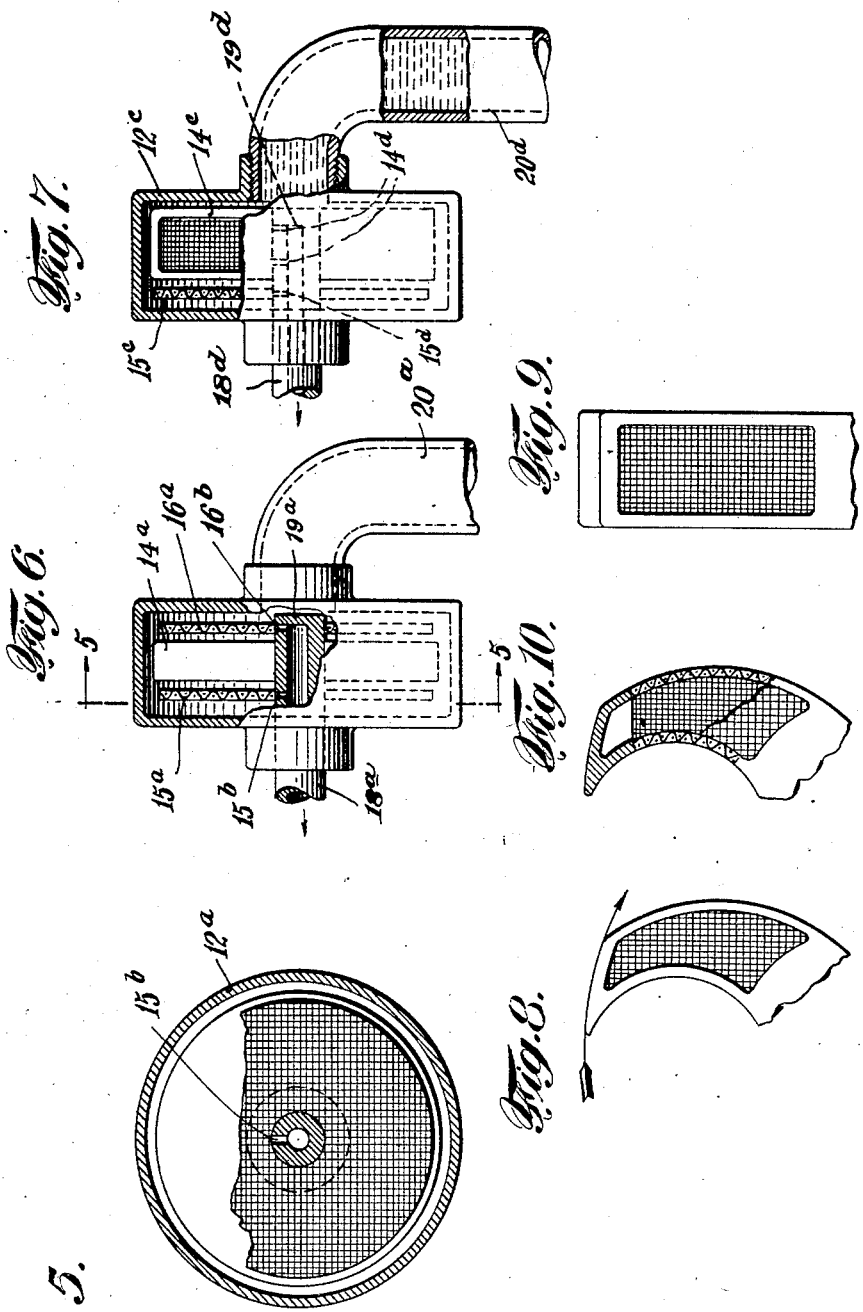

Patented Mar. 3, 1931

1,794,916

UNITED STATES PATENT OFFICE

JOHN J. NAUGLE, OF BROOKLYN, NEW YORK

MEANS FOR TREATING LIQUIDS

Substitution for application Serial No. 574,868, filed July 14, 1922. This application filed May 3, 1926.
Serial No. 106,378.

My present invention relates to means, comprising apparatus, for treating liquids containing adsorbable material, such as undesirable impurities giving such liquids undesirable colors and odors, in such a way as to effect the removal of such impurities in the most economical, expeditious and efficient manner possible. While not limited thereto, the means of the present invention are particularly suited for the treatment of such liquids as sugar melts, syrups, molasses, vegetable and other oils, and other liquids containing colloidal or other adsorbable materials giving to these liquids undesirable colors and odors.

It is an object of the present invention to provide apparatus of the general character specified above which shall be very simple in construction, which shall be easy to manipulate, which shall be little liable to get out of repair and which shall be adapted to carry out the desired purification in the most economical, expeditious and efficient manner. A further object of the present invention, in those cases where the desired purification is effected by means of the addition of a suitable adsorbent material, such as an activated or other carbon, or its equivalent, is to provide apparatus which shall effect as complete and as economical and efficient use of such adsorbent material as possible. Still another object of the present invention, in those cases where the desired purification is brought about by the use of an adsorbent, is to devise apparatus which shall bring about as intimate a contact as possible between the adsorbent and the liquid being purified, which shall at the same time conduct the purification in a substantially continuous manner and with the smallest amount possible of the adsorbent material, and which shall enable the removal of purified liquid at as high a rate and in as pure a state as possible.

In the accompanying specification I shall describe, and in the annexed drawing show, several illustrative embodiments of the present invention. It is, however, to be understood that my invention is not limited to the illustrative embodiments thereof herein shown and described for purposes of illustration only.

Referring to the drawings, wherein I have illustrated the aforesaid illustrative embodiments of the present invention:

Figure 1 is a somewhat diagrammatic view of the apparatus as a whole;

Figure 2 is a view, on an enlarged scale, partly in elevation and partly in section, of the combined impelling and filtering element forming one of the essential features of the present invention;

Figure 3 is a view, partly in longitudinal section and partly in elevation, of the combined impelling and filtering element shown in Figure 2;

Figure 4 is a view, partly in cross and longitudinal sections, and partly in elevation, of said combined impelling and filtering element;

Figure 5 is a longitudinal section, partly in elevation; and Figure 6 is a view, partly in cross section and partly in elevation, of a modified form of combined impelling and filtering element;

Figure 7 is a view, similar to Figure 6, of still another form of combined impelling and filtering element; and Figures 8, 9 and 10 are fragmentary detail views of further modifications of the combined impelling and filtering element.

Referring to the drawings, wherein I have illustrated the aforesaid illustrative embodiments of the present invention, and referring more particularly to Figures 1, 2, 3 and 4 diagrammatically illustrating the system as a whole, and one form of combined impelling and filtering element, 10 constitutes what may be termed a circulation or reagent tank provided with the filling means 10' and having an outlet pipe 11 communicating with an agitating tank 12 adjacent the center thereof. At 13 I have indicated a return pipe for liquid returning to the tank 10 due to the circulation effected by the impelling member 14 rotating within the agitating chamber 12.

In one of the preferred ways of operating the apparatus now being described, I provide the tank 10 by means of the filling means 10' with a fraction of the liquid intended to be purified in the apparatus. This liquid preferably already contains in suspension the entire amount of adsorbent material, such as the activated or other carbon, or equivalent material, intended to treat the entire amount of liquid to be purified. This fraction of liquid, containing the adsorbent material will, therefore, circulate through the tank 10, through the pipe 11, into the agitating chamber 12, where it will be subjected to the action of the combined impelling and filtering member 14, and will then be returned to the tank 10 through the pipe 13 in the direction indicated by the arrows in Figure 1.

Further increments or quantities of liquid to be purified are admitted to the substantially closed pressure system comprising the tank 10, the pipe 11, the agitating chamber 12, and the pipe 13, from the storage tank 15 by means of a pipe 16 controlled by a valve 17. By means of the valve 17 the rate at which further liquid to be purified is admitted from the tank 15 to the circulating system may be readily controlled and regulated.

It will be noted that liquid is admitted to the system through the tank 15 under considerable pressure, due to the hydrostatic pressure provided by the elevated position of the tank 15, or in any other equivalent manner. As already stated this degree of pressure may be regulated by means of the valve 17.

Purified liquid is withdrawn from the system under the action of the liquid pressure produced by the admission of further quantities of liquid from the tank 15 by means of the hollow shaft 18 which carries the member 14. The hollow shaft 18 is closed at one end, as indicated at 19, and is provided with the apertures 20 for communication with the interior of the impelling member 14, which will now be described in greater detail.

The impelling member 14 is suitably mounted for rotation on the hollow shaft 18, which is driven, as by means of a belt and pulley from any suitable source of power, not here deemed necessary to be shown. As already stated the hollow shaft 18 communicates by means of the apertures 20 with the interior of the hollow member 14.

The hollow member 14 is provided with a plurality of hollow blades 21. In the embodiment shown in Figures 2 and 3 of the drawing, each blade 21 of the impelling member 14 is provided on its front face with filtering means, such as a wire screen 22. The screen 22 is suitably positioned in an opening 23 in each blade 21, as by welding the screen in place. The screen should preferably be made of some non-corrodible metal, such as Monel metal.

The functions of the member 14 are numerous and all of them of great practical and theoretical importance. The member 14 acts first as an impelling member to bring about the circulation of the fraction of liquid, containing the adsorbent, from the tank 10, through the pipe 11, into the agitating chamber 12, and back to the tank 10 through the pipe 13. In the second place the member 14 serves to agitate that portion of the liquid which is within the agitating chamber 12, to bring about a maximum intimacy of contact between the liquid being purified and the adsorbent which may be used to effect such purification.

In the third place the member 14 gives to the liquid within said member 14 a rotative or swirling motion which, by centrifugal action, or otherwise, brings about a smaller concentration of adsorbent or other solid matter suspended in the liquid, nearer the center of the member 14, or adjacent the shaft 18, than in the peripheral or outer portions of said member 14. This enables purified liquid to be drawn off from the liquid being treated, from those portions of such liquid which have the smaller concentration of adsorbent or other suspended matter therein. This permits a higher rate of filtration and yields a much purer and higher grade of filtrate.

In the fourth place, the function of the member 14 is to serve as a filtering member by the provision of the filter screens 22 in the member 14. These screens are located sufficiently far enough below the outer ends of the hollow blades 21 as to cause the member 14 to receive purified liquid from those portions of the liquid within the chamber 12 containing the smaller proportion of adsorbent or other suspended solid matter. The purified liquid passing through the screens 12 under the action of the pressure maintained in the system and under the further action of suction caused by the centrifugal action due to the rotation of the blades 14, passes through the openings 20 into the hollow shaft 18, from which it may be led into any suitable storage tank for pure filtrate.

The shaft 18 may be provided with any suitable valve 18' for controlling the discharge of pure filtrate. Similarly, the pipe 11 may be provided with a valve 11', and the pipe 13 with a valve 13', for further controlling the circulation of fluid in the substantially closed pressure system comprising the tank 10, the pipe 11, the agitating chamber 12, and the pipe 13. Means, such as a drain 24, may be provided for removing spent carbon and for cleaning out the apparatus as a whole.

The manner of using the apparatus described in detail above, and the advantages of the same in use, are substantially as follows: After admitting to the tank 10, by means of the inlet 10', a suitable fraction of the entire amount of liquid to be treated, to which fraction may initially be added the entire amount of adsorbent material that may be used for effecting the desired purification, and after opening the valves 11' and 13', and closing the drain 24, the shaft 18 may be put into rotation by any suitable means not here deemed necessary to be shown. At the same time valves 17 and 18' may be opened. This manipulation of the apparatus brings about a circulation of liquid in the tank 10, carrying with it the adsorbent purifying material in the direction indicated by the arrows in Figure 1 of the drawing.

At the same time further quantities of liquid to be purified are admitted under pressure to the system from the tank 15 through the pipe 16 controlled by the valve 17. The admission of further quantities of liquid to be treated preferably takes place in a substantially continuous manner. At the same time purified liquid passes through the screens 22 of the rapidly rotating member 14, through the apertures 20, and thus into the hollow shaft 18 controlled by valve 18'. From the hollow shaft the purified liquid may be sent to any suitable tank for storing purified liquid. The withdrawal of pure liquid through the hollow shaft 18 likewise takes place in a substantially continuous manner.

The member 14 may be rotated at a speed corresponding to from about 500 to about 1500 revolutions per minute, as desired. The substantially closed pressure system may initially contain about 10% of the entire amount of liquid to be treated up to the point where the carbon or other adsorbent that may be used in the treatment is entirely used up or exhausted. For example, if 200,000 pounds of liquid are to be treated in one unit of this apparatus, in a given time, up to the point of exhaustion of the carbon, the system may initially contain about 10,000 pounds of liquid holding in suspension about 200 pounds of adsorbent material, such as activated carbon. While various kinds and grades of decolorizing carbon may be used, I prefer to use the carbon known in the trade as "Suchar", since I find that this carbon posseses many advantages for the desired purpose.

The rate at which further quantities of liquid to be treated are added to the system from the tank 15, depends, of course, upon the amount of impurities present in the liquid and upon the amount of adsorbent material present in the system. The rate of admission of further quantities of liquid to be treated and the rate at which purified liquid is withdrawn from the system may be controlled by means of the valves 11', 13', 17 and 18', so as to yield a filtrate of the desired degree of purity.

The member 14 acts first to bring about a circulation of the liquid in the substantially closed pressure system; acts secondly to violently agitate the liquid in the chamber 12 in the presence of the adsorbent, to effect as intimate a contact between the adsorbent and the liquid to be purified as possible; acts thirdly to generate fresh surfaces of contact in the adsorbent for the more efficient adsorption of adsorbable materials, as by breaking up the adsorbent material or by frequently cleaning the surfaces of the same by friction, for the further coagulation and adsorption of colloidal or other materials giving the liquid the undesirable color and odoriferous properties which it is one of the objects of the present apparatus to remove; and fourthly, acts as an efficient filtering medium for filtering pure filtrate away from the adsorbent, through the screens 22, the apertures 20, and the hollow shaft 18.

When the entire amount of liquid intended to be purified by the given amount of adsorbent has been purified, and the adsorbent, such as the activated carbon, or its equivalent, has been exhausted or used up, the valve 17 may be closed, and the valves 11', 13' and 18' may be opened wide. Thereupon, cleaning fluid, such as water, may be passed in the reverse direction through the apparatus, through the hollow shaft 18, the apertures 20 and the screens 19, and thus out through the drain 24. This removes the spent carbon and any sugar or other values left in the system. The sugar values may thereupon be recovered, and the spent carbon may then be revivified in the manner well-known to those skilled in the art to which the present invention relates. Such revivified carbon may often be found to possess a higher degree of activity than the carbon in its original condition.

The advantages of the present invention are numerous and of great practical importance. The present apparatus not only is very compact and very simple in construction, but may also be operated in a very simple and efficient manner with a minimum of labor, space and equipment, and with little likelihood of its getting out of repair. The present apparatus also brings about the maximum usefulness of the carbon or other adsorbent where the same is used, due to the circulation of the liquid containing the adsorbent, due also to the great intimacy of contact between the adsorbent and the carbon, effected by the agitation of the liquid in the agitating chamber by means of the impelling member and due also to the action of the impelling member in breaking up the carbon or other adsorbent, and in this way, or by friction, generating fresh surfaces of contact for the treatment of further portions of liquid.

The apparatus also permits a very high rate of filtration and the complete purification of the liquid with a minimum amount of carbon or other adsorbent. The filtrate is also remarkably pure and results in a superior product commanding a higher price in the market.

In Figures 5 and 6 I have illustrated a modification of the agitating chamber in which I use a solid impelling member 14a and a plurality of hollow filtering members 15a and 16a.

The members 14a, 15a, and 16a are all carried by a hollow shaft 18a so as to rotate with the same. The hollow shaft 18a is closed at one end, as indicated at 19a, and is provided with apertures 15b and 16b communicating with the respective hollow filtering elements 15a and 16a. The liquid to be purified passes into the agitating chamber 14a through the pipe 20a.

The operation of this modification is substantially like that of the modification shown in Figures 2, 3, and 4 of the drawing, the system being otherwise the same, and the advantages resulting from this modification being substantially the same as those resulting from the modification already described in detail above.

In Figure 7 I have shown a further modification in which the casing 12c is provided with the hollow combined impelling and filtering member 14c, and the hollow filtering element 15c. The elements 14c and 15c communicate, by means of suitable apertures or perforations 14d and 15d, with the hollow shaft 18d which is closed at one end, as indicated at 19d. The liquid to be purified passes into the casing 12c through the pipe 20d.

The operation of this modification is substantially like that of the modification shown in Figures 2, 3, and 4 of the drawing, and also in Figures 5 and 6 of the drawing, except that in this case purified fluid passes to the hollow shaft through both the hollow impelling member 14c and the hollow filtering element 15c. The system is otherwise substantially the same as the system illustrated in Figures 2, 3, and 4, and in Figures 5 and 6 of the drawing, and the advantages resulting from this modification are substantially the same as those resulting from the modifications already described in detail above.

While I have shown the combined impelling and filtering element in Figures 2, 3, and 7, as being provided with a filtering screen or equivalent member only on the forward or front portion of each of the blades of such combined impelling and filter member, each blade may be provided with such a filtering screen on its sides, as shown in Figure 8 of the drawing, or on its rear face, as shown in Figure 9 of the drawing, or on both of its sides and on its front and rear faces, as shown in Figure 10 of the drawing. This last arrangement, particularly, provides a very large area of filtering medium in a very small and compact space, and offers many advantages where a very high rate of filtration is desired.

This application is a substitution for an application bearing the same title filed July 14, 1922, under Serial No. 574,868.

What I claim is:

1. An apparatus for treating a liquid containing adsorbable material comprising, in combination, means for circulating said liquid in the presence of an adsorbent, means associated with said circulating means for vigorously agitating said liquid in the presence of said adsorbent, said latter means including a rotatable member having a plurality of blades and a filtering medium associated with each of said blades and screening one side thereof, means for continually adding to said liquid further quantities of liquid to be treated, and means for continually withdrawing portions of liquid substantially free from adsorbable material.

2. An apparatus for treating a liquid containing adsorbable material comprising, in combination, means including a substantially closed circulating system for circulating said liquid in the presence of an adsorbent, means associated with said circulating means for vigorously agitating said liquid in the presence of said adsorbent, said latter means including a rotatable member having a plurality of blades and a filtering medium associated with each of said blades and screening one side thereof, means for continually adding to said liquid further quantities of liquid to be treated, and means for continually withdrawing portions of liquid substantially free from adsorbable material.

3. An apparatus for treating a liquid containing adsorbable material comprising, in combination, means for circulating said liquid in the presence of an adsorbent, means associated with said circulating means for effecting a smaller concentration of said adsorbent in one portion of said liquid than in another, said latter means including a rotatable member having a plurality of blades and a filtering medium associated with each of said blades and screening one side thereof, means for continually adding to said liquid further quantities of liquid to be treated, and means for continually withdrawing portions of liquid substantially free from adsorbable material from the portion of said liquid containing the smaller concentration of adsorbent.

4. An apparatus for treating a liquid containing adsorbable material comprising, in combination, means including a substantially closed circulating system for circulating said liquid in the presence of an adsorbent, means associated with said circulating means for effecting a smaller concentration of said adsorbent in one portion of said liquid than in another, said latter means including a rotatable member having a plurality of blades and a filtering medium associated with each of said blades and screening one side thereof, means for continually adding to said liquid further quantities of liquid to be treated, and means for continually withdrawing portions of liquid substantially free from adsorbable material from the portion of said liquid containing the smaller concentration of adsorbent.

5. Apparatus for treating liquids, comprising a plurality of hollow impelling members for effecting a circulation of the liquid being treated, and a filtering medium associated with each of said members and screening one side thereof.

6. Apparatus for treating liquids, comprising a hollow rotatable shaft, a plurality of hollow impelling members communicating with said shaft and rotatable therewith for effecting a circulation of the liquid being treated, and a filtering medium associated with each of said members and screening one side thereof.

7. Apparatus for treating liquids, comprising a hollow rotatable shaft, a plurality of impelling members communicating with said shaft and rotatable therewith for effecting a circulation of the liquid being treated, and a filtering medium associated with each of said members and screening one side thereof.

8. An apparatus for treating a liquid containing adsorbable material comprising, in combination, means for circulating said liquid in the presence of an adsorbent, means associated with said circulating means for vigorously agitating said liquid in the presence of said adsorbent, said latter means including a rotatable member having a plurality of blades and a filtering medium associated with each of said blades and partially screening one side thereof, means for continually adding to said liquid further quantities of liquid to be treated, and means for continually withdrawing portions of liquid substantially free from adsorbable material.

9. An apparatus for treating a liquid containing adsorbable material comprising, in combination, means including a substantially closed circulating system for circulating said liquid in the presence of an adsorbent, means associated with said circulating means for vigarously agitating said liquid in the presence of said adsorbent, said latter means including a rotatable member having a plurality of blades and a filtering medium associated with each of said blades and partially screening one side thereof, means for continually adding to said liquid further quantities of liquid to be treated, and means for continually withdrawing portions of liquid substantially free from adsorbable material.

10. An apparatus for treating a liquid containing adsorbable material comprising, in combination, means for circulating said liquid in the presence of an adsorbent, means associated with said circulating means for effecting a smaller concentration of said adsorbent in one portion of said liquid than in another, said latter means including a rotatable member having a plurality of blades and a filtering medium associated with each of said blades and partially screening one side thereof, means for continualy adding to said liquid further quantities of liquid to be treated, and means for continually withdrawing portions of liquid substantially free from adsorbable material from the portion of said liquid containing the smaller concentration of adsorbent.

11. An apparatus for treating a liquid containing adsorbable material comprising, in combination, means including a substantially closed circulating system for circulating said liquid in the presence of an adsorbent, means associated with said circulating means for effecting a smaller concentration of said adsorbent in one portion of said liquid than in another, said latter means including a rotatable member having a plurality of blades and a filtering medium associated with each of said blades and partially screening one side thereof, means for continually adding to said liquid further quantities of liquid to be treated, and means for continually withdrawing portions of liquid substantially free from adsorbable material from the portion of said liquid containing the smaller concentration of adsorbent.

12. Apparatus for treating liquids, comprising a plurality of hollow impelling members for effecting a circulation of the liquid being treated, and a filtering medium associated with each of said members and partially screening one side thereof.

13. Apparatus for treating liquids, comprising a hollow rotatable shaft, a plurality of hollow impelling members communicating with said shaft and rotatable therewith for effecting a circulation of the liquid being treated, and a filtering medium associated with each of said members and partially screening one side thereof.

14. In an apparatus of the class described, a rotatable agitating and impelling member having a plurality of blades and a filtering medium associated with each of said blades and screening one side thereof.

15. In an apparatus of the class described, a rotatable agitating and impelling member having a plurality of blades and a filtering medium associated with each of said blades and partially screening one side thereof.

16. In an apparatus of the class described, a rotatable agitating and impelling member having a plurality of blades curving in a direction contrary to that in which the member rotates, and a filtering medium associated with each of said blades and screening one side thereof.

17. In an apparatus of the class described, a rotatable agitating and impelling member having a plurality of blades curving in a direction contrary to that in which the member rotates, and a filtering medium associated with each of said blades and partially screening one side thereof.

18. An apparatus for treating a liquid containing adsorbable material comprising, in combination, means for circulating said liquid in the presence of an adsorbent, means associated with said circulating means for vigorously agitating said liquid in the presence of said adsorbent, said latter means including a rotatable member having a plurality of blades curving in a direction contrary to that in which the member rotates, and a filtering medium associated with each of said blades and screening one side thereof, means for continually adding to said liquid further quantities of liquid to be treated, and means for continually withdrawing portions of liquid substantially free from adsorbable material.

19. An apparatus for treating a liquid containing adsorbable material comprising, in combination, means including a substantially closed circulating system for circulating said liquid in the presence of an adsorbent, means associated with said circulating means for vigorously agitating said liquid in the presence of said adsorbent, said latter means including a rotatable member having a plurality of blades curving in a direction contrary to that in which the member rotates and a filtering medium associated with each of said blades and screening one side thereof, means for continually adding to said liquid further quantities of liquid to be treated, and means for continually withdrawing portions of liquid substantially free from adsorbable material.

20. An apparatus for treating a liquid containing adsorbable material comprising, in combination, means including a substantially closed circulating system for circulating said liquid in the presence of an adsorbent, means associated with said circulating means for vigorously agitating said liquid in the presence of said adsorbent, said latter means including a rotatable member having a plurality of blades curving in a direction contrary to that in which the member rotates and a filtering medium associated with each of said blades and partially screening one side thereof, means for continually adding to said liquid further quantities of liquid to be treated, and means for continually withdrawing portions of liquid substantially free from adsorbable material.

21. An apparatus for treating a liquid containing adsorbable material comprising, in combination, means for circulating said liquid in the presence of an adsorbent, means associated with said circulating means for effecting a smaller concentration of said adsorbent in one portion of said liquid than in another, said latter means including a rotatable member having a plurality of blades curving in a direction contrary to that in which the member rotates and a filtering medium associated with each of said blades and screening one side thereof, means for continually adding to said liquid further quantities of liquid to be treated, and means for continually withdrawing portions of liquid substantially free from adsorbable material from the portion of said liquid containing the smaller concentration of adsorbent.

22. An apparatus for treating a liquid containing adsorbable material comprising, in combination, means including a substantially closed circulating system for circulating said liquid in the presence of an adsorbent, means associated with said circulating means for effecting a smaller concentration of said adsorbent in one portion of said liquid than in another, said latter means including a rotatable member having a plurality of blades curving in a direction contrary to that in which the member rotates and a filtering medium associated with each of said blades and screening one side thereof, means for continually adding to said liquid further quantities of liquid to be treated, and means for continually withdrawing portions of liquid substantially free from adsorbable material from the portion of said liquid containing the smaller concentration of adsorbent.

23. An apparatus for treating a liquid containing adsorbable material comprising, in combination, means for circulating said liquid in the presence of an adsorbent, means associated with said circulating means for effecting a smaller concentration of said adsorbent in one portion of said liquid than in another, said latter means including a rotatable member having a plurality of blades curving in a direction contrary to that in which the member rotates and a filtering medium associated with each of said blades and partially screening one side thereof, means for continually adding to said liquid further quantities of liquid to be treated, and means for continually withdrawing portions of liquid substantially free from adsorbable material from the portion of said liquid containing the smaller concentration of adsorbent.

24. An apparatus for treating a liquid containing adsorbable material comprising, in combination, means including a substantially closed circulating system for circulating said liquid in the presence of an adsorbent, means associated with said circulating means for effecting a smaller concentration of said adsorbent in one portion of said liquid than in another, said latter means including a rotatable member having a plurality of blades curving in a direction contrary to that in which the member rotates, and a filtering medium associated with each of said blades and partially screening one side thereof, means for continually adding to said liquid further quantities of liquid to be treated, and means for continually withdrawing portions of liquid substantially free from adsorbable material from the portion of said liquid containing the smaller concentration of adsorbent.

25. In an apparatus of the class described, a rotatable hollow shaft, an agitating and impelling member carried thereon and in communication therewith, said agitating and impelling member comprising a plurality of blades and a filtering medium associated with each of said blades and screening one side thereof.

26. In an apparatus of the class described, a rotatable hollow shaft, an agitating and impelling member carried thereon and in communication therewith, said agitating and impelling member comprising a plurality of blades and a filtering medium associated with each of said blades and partially screening one side thereof.

27. In an apparatus of the class described, a rotatable hollow shaft, an agitating and impelling member carried thereon and in communication therewith, said agitating and impelling member comprising a plurality of blades curving in a direction contrary to that in which the member rotates, and a filtering medium associated with each of said blades and screening one side thereof.

28. In an apparatus of the class described, a rotatable hollow shaft, an agitating and impelling member carried thereon and in communication therewith, said agitating and impelling member comprising a plurality of blades curving in a direction contrary to that in which the member rotates, and a filtering medium associated with each of said blades and partially screening one side thereof.

In testimony whereof, I have signed my name to this specification this 9th day of April, 1926.

JOHN J. NAUGLE.